June 30, 1964  J. E. MILES  3,139,021
AERATING TUBE SUSPENSION UNIT
Filed Feb. 20, 1962
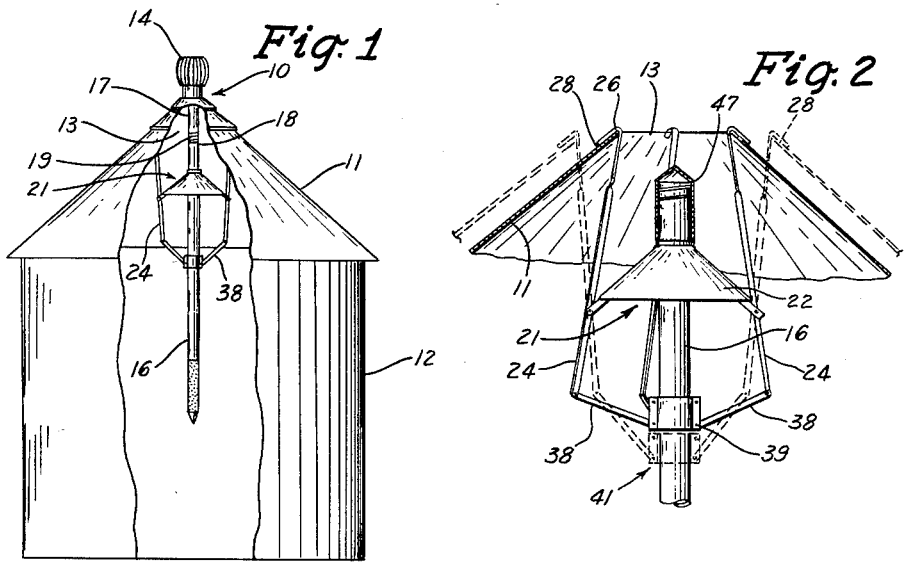
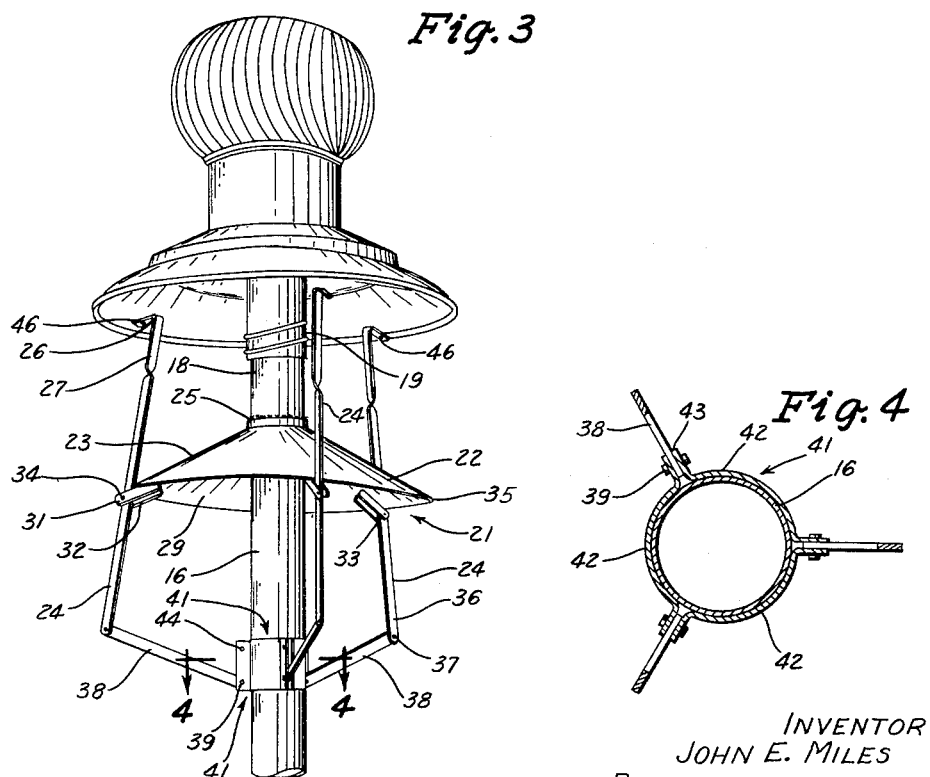
INVENTOR
JOHN E. MILES
BY
Lowell & Henderson
ATTORNEYS 3,139,021
AERATING TUBE SUSPENSION UNIT
John E. Miles, Mason City, Iowa, assignor to Aer-Vac Incorporated, Mason City, Iowa, a corporation of Iowa
Filed Feb. 20, 1962, Ser. No. 174,503
4 Claims. (Cl. 98—55)

This invention relates generally to grain conditioner and drier devices for grain storage bins and in particular to an adjustable suspension unit for vertically suspending such devices within a bin.

A usual type of aerating device for drying grain within a storage bin includes a wind turbine or spinner from the lower end of which is detachably suspended an aerating or ventilating tube. The wind turbine in this type of device projects upwardly from the roof of the bin with the aerating tube being extended downwardly from the roof and into the grain to be conditioned and dried.

Where the grain storage bin is of a circular shape having a conical roof with a central opening formed therein, the aerating device is usually vertically suspended through the opening and supported on the roof about the opening. To fill the bin with grain the aerating device is removed therefrom, after which the grain is supplied through the roof opening. The aerating tube is then inserted through the opening and driven downwardly into the grain to a position providing for its suspended support from the roof and relative assembly with the wind turbine. The operation of positioning of the aerating device within the bin, after the bin has been filled with grain, is both time consuming and laborious along with necessitating a particular dimensioned suspension means or a roof jack to accommodate the size of the roof opening.

It is an object of this invention, therefore, to provide an improved means for suspending the aerating tube of a grain conditioning device from the roof of a grain bin.

A further object of this invention is to provide a suspension unit for the aerating tube wherein suspension members are movable relative to the tube to adjusted positions for accommodating roof openings of different sizes.

Another object of this invention is to provide a suspension unit for the aerating tube wherein a combination mounting and grain deflecting member fixed to the tube carries adjustable suspension members adapted to be attached to the roof about the opening therein.

Still a further object of this invention is to provide for the suspension of an aerating tube in a grain bin, prior to the filling of the bin with grain, wherein a part of the suspension unit functions to deflect the grain, during a filling operation, toward the outside of the bin whereby to facilitate the filling of the bin and to eliminate any need for a driving of the tube into a grain filled bin.

Further objects, features and advantages of this invention will become apparent from the following description when taken in connection with the accompanying drawing wherein:

FIG. 1 is a side elevational view of a circular grain bin having a conical roof, with parts broken away to show the relative assembly therewith of the aerating tube suspension unit of this invention;

FIG. 2 is a detail side elevational view of the suspension unit shown in assembly relation with the roof of a grain bin;

FIG. 3 is a perspective view of the suspension unit shown in assembly relation with an aerating tube and wind turbine; and FIG. 4 is an enlarged sectional detail view as seen along the line 4—4 in FIG. 3.

With reference to the drawing there is shown in FIG. 1 an aerating device, designated generally as 10, supported from a conical roof 11 for a circular storage bin 12 and extended within a central opening 13 formed in the roof. The aerating device 10 is of a usual type including a wind turbine 14 located above the roof 11, and a tubular aerating member 16 extended downwardly below the roof 11 and into the bin 12. A tubular inlet connection 17 for the wind turbine 14 is detachably connected or coupled with the upper or outlet end 18 of the aerating tube 16, as by means of a threaded connection indicated at 19.

The suspension unit of this invention, designated generally as 21, for vertically suspending the aerating member 16 from the roof 11, as shown in FIG. 1, is best illustrated in FIG. 3 and is seen to include a conical member 22 mounted on and positioned about the aerating tube 16 at a location spaced downwardly from the upper end 18 of the tube. The conical member 22 is formed of a flat sheet material and has its outer surface 23 inclined downwardly and outwardly from the tube 16. An upstanding peripheral rim 24 about a central opening (not shown) formed in the conical member 22, is secured as by welding to the tube 16, whereby the conical member 22 is fixed relative to the tube 16.

Spaced circumferentially about the conical member 22 and extended longitudinally of the aerating tube 16 are a plurality of elongated suspension members 24, illustrated in FIG. 3 as three in number, spaced one hundred and twenty degrees apart. Each suspension member 24 is of a like construction and is formed from a flat strap iron material with a substantially V-shaped hook 26 at its upper end 27 adapted to engage and be supported on that part 28 of the roof 11 located about and defining the side wall of the central roof opening 13 (FIG. 2).

The conical member 22, at circumferentially spaced positions corresponding to the spacing of the suspension members 24, has secured to its under side 29 pairs of spaced lugs or fingers 31 and 32 which project radially outwardly from the outer periphery 32 of the conical member 22. Received between the projected ends of each pair of fingers 31 and 32 is an intermediate portion 33 of a corresponding suspension member 24. A pivot pin 34 carried in a pair of fingers 31 and 32 and extended through a corresponding suspension member 24 pivotally supports a member 24 for pivotal movement in a vertical plane extended radially from the aerating tube 16.

The lower end 36 of each suspension member 24 is pivotally connected at 37 to one end of a link member 38, the opposite end of which is pivotally connected at 39 to a segmental collar or sleeve member 41 positioned about the aerating tube 16. As best appears in FIG. 4 the collar 41 is formed of three arcuate segments 42 the ends of which terminate in radially extended wings 43. A lower end of each link member 38 is received between a pair of adjacent wings 43, with a pivot 39 constituting a clamping nut and bolt assembly carried in a pair of adjacent wings 43 and extended through a corresponding link 38.

When the pivots 39 are loosened the sleeve 41 is free to move longitudinally of the aerating tube 16 concurrently with a free pivotal movement of a link 38 relative to a pivot 39. However, on tightening of the pivots 39 the segments 42 are firmly clamped about the tube 16, concurrently with the clamping of a link 38 between a pair of adjacent wings 43. To facilitate the clamping of the sleeve 41 about the tube 16 additional nut and bolt assemblies 44 are provided as best shown in FIG. 3.

In use, and prior to the filling of the bin 12 with grain, the wind turbine 14 is disconnected from the aerating tube 16 at the detachable connection 19. The tube 16, with the suspension unit 21 assembled thereon, is positioned below the roof opening 13 and the suspension members 24 pivotally moved to adjusted positions providing for the engagement and support of the hooks 26 at their upper ends 27 with the side wall 28 of the opening 13, as best illustrated in FIG. 2. The hooks 26 are then secured to the roof 11 as by the insertion of suitable screws through openings 46 provided in the hooks 26 (FIG. 3).

With the suspension members 24 thus adjusted relative to the roof opening 13 the assemblies 39 are tightened whereby to clamp the collar 41 against movement relative to the aerating tube 16 and to positively lock the suspension members 24 against pivotal movement.

As shown in FIG. 2 a cap member 47 is then placed over the upper end 18 of the aerating tube 16 in a supported position on the upper end of the conical member 22. As the bin 12 is filled with grain through the opening 13, the cap 47 prevents the entry of such grain within the tube 16 and the conical member 22 functions as a deflecting member to direct the grain toward the outside portions of the bin 12 whereby to facilitate the filling of the bin.

After the bin has been filled the cap 47 is removed and the wind turbine 14 is then detachably connected with the upper end 18 of the aerating tube 16 at the threaded connection 19.

It is seen, therefore, that the conical member 22 functions both as a mounting member for the suspension members 24 and as a grain deflector to aid in filling of the bin 12. It is further apparent that the locking collar 41 and the links 38, when the assemblies 39 are loosened, permit a free movement of the suspension members 24 to adjusted positions relative to the roof opening 13, and that when such adjusted positions are attained function to positively lock the suspension members 24 against pivotal movement so as to retain the aerating tube 16 in a vertically suspended position within the bin 12.

Although the invention has been described with respect to a preferred embodiment thereof it is to be understood that it is not to be so limited since changes can be made therein which are within the full intended scope of this invention as defined in the appended claims.

I claim:
1. An apparatus for vertically suspending a grain aerating device having a tubular aerating member beneath an opening in the roof of a storage bin comprising:
   (a) first means adapted to be positioned about and secured to an upper section of said aerating member, said first means having circumferentially spaced radial portions extended in outward directions,
   (b) a plurality of elongated suspension members corresponding to said radial portions and extended longitudinally of said aerating member, said suspension members having upper end sections adapted to project through said opening in the roof,
   (c) second means pivotally connecting a suspension member intermediate the ends thereof with a corresponding radial portion for pivotal movement in a vertical plane,
   (d) a collar member adapted to be mounted about said aerating member below said first means for movement longitudinally of said aerating member,
   (e) a plurality of link members corresponding to said suspension members each of which has means at one end thereof movably connecting said one end to said collar member, and means at the other end thereof movably connecting said other end to the lower end of a corresponding suspension member, whereby on pivotal movement of said suspension members said collar member is longitudinally movable to provide for the movement of the upper end sections of said suspension members to adjusted positions so as to engage portions of the roof defining the opening therein when said upper end sections project through said roof opening,
   (f) means adapted to secure said upper end sections to said roof, and
   (g) means operatively associated with said collar member and operable to releasably lock said collar member on said aerating member.

2. An apparatus for vertically suspending a grain aerating device having a aerating member beneath an opening in the roof of a storage bin comprising
   (a) a plurality of elongated suspension members positionable radially outwardly from said aerating member and extended longitudinally thereof,
   (b) means adapted to be secured to said aerating member for pivotally supporting said suspension members intermediate the ends thereof for pivotal movement in vertical planes whereby the upper ends of said suspension members are movable to adjusted positions providing for the engagement thereof with that part of said roof portion located about said opening,
   (c) means adapted to secure said upper ends to said roof, and
   (d) means including a collar member positionable about said aerating member for locking the lower ends of said suspension members against pivotal movement when the upper ends thereof are in said adjusted positions.

3. The invention according to claim 2 wherein said means for pivotally supporting said suspension members includes a conical member mountable on and positionable about said aerating member with the outer surface thereof inclined downwardly and outwardly from said aerating member.

4. The apparatus defined in claim 1 wherein:
   (a) said first means comprises a conical member.

References Cited in the file of this patent
UNITED STATES PATENTS

| | | |
|---|---|---|
| 152,994 | Hinckley et al. | July 14, 1874 |
| 926,772 | Scharnberg | July 6, 1909 |
| 2,704,501 | Rysdon | Mar. 22, 1955 |
| 2,898,839 | McKann | Aug. 11, 1959 |